(12) United States Patent
Heberer et al.

(10) Patent No.: US 10,852,071 B2
(45) Date of Patent: Dec. 1, 2020

(54) METHOD OF OPERATING AN ENERGY RECOVERY SYSTEM

(71) Applicant: Carrier Corporation, Palm Beach Gardens, FL (US)

(72) Inventors: Dwight H. Heberer, Brownsburg, IN (US); Eric W. Adams, Manlius, NY (US)

(73) Assignee: CARRIER CORPORATION, Palm Beach Gardens, FL (US)

( * ) Notice: Subject to any disclaimer, the term of this patent is extended or adjusted under 35 U.S.C. 154(b) by 122 days.

(21) Appl. No.: 16/029,838

(22) Filed: Jul. 9, 2018

(65) Prior Publication Data

US 2018/0313614 A1 Nov. 1, 2018

Related U.S. Application Data

(62) Division of application No. 14/074,055, filed on Nov. 7, 2013, now Pat. No. 10,041,743.

(60) Provisional application No. 61/749,658, filed on Jan. 7, 2013.

(51) Int. Cl.
| | | |
|---|---|---|
| *F28D 21/00* | (2006.01) | |
| *F28F 9/02* | (2006.01) | |
| *F24F 12/00* | (2006.01) | |

(52) U.S. Cl.
CPC ........ *F28D 21/0001* (2013.01); *F24F 12/006* (2013.01); *F28F 9/0246* (2013.01); *Y02B 30/56* (2013.01)

(58) Field of Classification Search
CPC ...... F28D 21/001; F24F 12/006; F28F 9/0246
See application file for complete search history.

(56) References Cited

U.S. PATENT DOCUMENTS

| 211,332 A | 1/1879 | Kelly |
|---|---|---|
| 1,975,316 A | 10/1934 | Ferris |
| 2,189,895 A | 2/1940 | Fritz |
| 2,439,109 A | 4/1948 | Stout |
| 2,570,910 A | 10/1951 | Berry |
| 2,814,977 A | 12/1957 | Noll |
| 2,828,110 A | 3/1958 | Baker et al. |
| 2,868,108 A | 1/1959 | Petersen |
| 2,973,704 A | 3/1961 | Flanagan |
| 2,995,077 A | 8/1961 | Kitson |
| 3,026,789 A | 3/1962 | Mead |
| 3,057,288 A | 10/1962 | Papsdorf |
| 3,250,206 A | 5/1966 | Strouth |
| 3,286,479 A | 11/1966 | Nolan et al. |
| 3,299,796 A | 1/1967 | Toper et al. |

(Continued)

FOREIGN PATENT DOCUMENTS

| CN | 101362159 A | 2/2009 |
|---|---|---|
| GB | 157562 | 1/1921 |

(Continued)

*Primary Examiner* — Ljiljana V. Ciric
(74) *Attorney, Agent, or Firm* — Cantor Colburn LLP

(57) ABSTRACT

A method of operating an energy recovery system includes providing a flow of fresh air from an energy recovery ventilator through a supply port into a component of a heating and cooling system. Stale air is blown from the component through a return port into the energy recovery ventilator, the return port including a shield configured to at least partially prevent fresh air flowing from the supply port into the component from recirculating through the return port.

3 Claims, 8 Drawing Sheets

(56) References Cited

U.S. PATENT DOCUMENTS

| | | |
|---|---|---|
| 3,440,947 A | 4/1969 | Averill |
| 3,666,007 A | 5/1972 | Yoshino et al. |
| 3,673,945 A | 7/1972 | Rachlin et al. |
| 3,772,861 A | 11/1973 | Gunyou et al. |
| 3,813,214 A | 5/1974 | Alpine |
| 3,842,722 A | 10/1974 | Miller |
| 3,926,249 A | 12/1975 | Glancy |
| 3,934,798 A | 1/1976 | Goldsmith |
| 3,945,430 A | 3/1976 | Van Beukering et al. |
| 2,400,726 A | 5/1976 | Walter et al. |
| 3,977,466 A | 8/1976 | Johansson |
| 4,022,117 A | 5/1977 | Mallian |
| 4,040,477 A | 8/1977 | Garberick |
| 4,044,950 A | 8/1977 | Engeling et al. |
| 4,100,763 A | 7/1978 | Brody |
| 4,117,883 A | 10/1978 | Feldmann |
| 4,142,575 A | 3/1979 | Glancy |
| 4,147,303 A | 4/1979 | Talucci |
| 4,149,590 A | 4/1979 | Ospelt |
| 4,171,089 A | 10/1979 | Schossow |
| 4,185,685 A | 1/1980 | Giberson |
| 4,206,742 A | 6/1980 | Johnson |
| 4,215,814 A | 8/1980 | Ebert |
| 4,217,878 A | 8/1980 | Wieweck |
| 4,241,874 A | 12/1980 | Schossow |
| 4,252,181 A | 2/1981 | Kirchmeier |
| 4,281,522 A | 8/1981 | Bussjager |
| 4,336,748 A | 6/1982 | Martin et al. |
| 4,377,201 A | 3/1983 | Kruse et al. |
| 4,389,853 A | 6/1983 | Hile |
| 4,391,616 A | 7/1983 | Imamura |
| 4,397,157 A | 8/1983 | Keuch |
| 4,408,716 A | 10/1983 | Rockwell |
| 4,462,459 A | 7/1984 | Schmidlin |
| 4,478,056 A | 10/1984 | Michaels, Jr. |
| 4,495,986 A | 1/1985 | Clark et al. |
| 4,497,361 A | 2/1985 | Hajicek |
| 4,503,902 A | 3/1985 | Zolik |
| 4,512,392 A | 4/1985 | van Ee et al. |
| 4,512,393 A | 4/1985 | Maendel |
| 4,513,809 A * | 4/1985 | Schneider ............. F24F 12/001 165/54 |
| 4,519,539 A | 5/1985 | Bussjager et al. |
| 1,537,035 A | 8/1985 | Stiles |
| 4,537,035 A * | 8/1985 | Stiles ............. F24F 1/022 165/250 |
| 4,550,773 A | 11/1985 | Martin |
| 4,676,073 A | 6/1987 | Lawrence |
| 4,727,931 A | 3/1988 | Berner |
| 4,742,957 A | 5/1988 | Mentuch |
| 4,757,744 A | 7/1988 | Bouvot |
| 4,759,196 A | 7/1988 | Davis |
| 4,799,539 A | 1/1989 | Atkin et al. |
| 4,823,679 A | 4/1989 | Robbins |
| 4,834,285 A * | 5/1989 | Besik ............. F24F 3/1411 126/110 C |
| 4,852,640 A | 5/1989 | Besik |
| 4,865,118 A | 9/1989 | Moland |
| 4,887,438 A | 12/1989 | Meckler |
| 4,909,307 A * | 3/1990 | Besik ............. F24F 3/1411 137/309 |
| 4,924,934 A | 5/1990 | Steele |
| 4,952,283 A | 8/1990 | Besik |
| 5,002,118 A | 3/1991 | Olmstead et al. |
| 5,063,835 A | 11/1991 | Rockx |
| 5,183,098 A | 2/1993 | Chagnot |
| 5,238,052 A | 8/1993 | Chagnot |
| 5,295,905 A | 3/1994 | Simple |
| 5,301,744 A | 4/1994 | Derks |
| 5,344,287 A | 9/1994 | Schaefer |
| 5,417,278 A | 5/1995 | Pipher et al. |
| 5,423,187 A | 6/1995 | Fournier |
| 5,431,215 A | 7/1995 | Davis |
| 5,447,037 A | 9/1995 | Bishop et al. |
| 5,485,878 A | 1/1996 | Derks |
| 5,490,557 A | 2/1996 | Taylor |
| 5,497,823 A | 3/1996 | Davis |
| 5,548,970 A | 8/1996 | Cunningham, Jr. et al. |
| 5,617,913 A | 4/1997 | DeGregoria et al. |
| 5,632,334 A | 5/1997 | Grinbergs et al. |
| 5,636,786 A | 6/1997 | Daneshvar et al. |
| 5,675,908 A | 10/1997 | Barnes |
| 5,724,898 A | 3/1998 | Von Bockh et al. |
| 5,761,908 A | 6/1998 | Oas et al. |
| 5,826,641 A | 10/1998 | Bierwirth et al. |
| 5,855,320 A | 1/1999 | Grinbergs |
| 5,937,667 A | 8/1999 | Yoho, Sr. |
| 5,953,320 A | 9/1999 | Williamson et al. |
| 5,953,926 A * | 9/1999 | Dressler ............. F24F 3/147 236/44 C |
| 6,039,109 A | 3/2000 | Chagnot et al. |
| 6,083,300 A | 7/2000 | McFadden |
| 6,141,979 A | 11/2000 | Dunlap |
| 6,168,380 B1 | 1/2001 | Weigand |
| 6,257,317 B1 | 7/2001 | DeGregoria et al. |
| 6,267,536 B1 | 7/2001 | Adachi et al. |
| 6,328,095 B1 | 12/2001 | Felber et al. |
| 6,355,091 B1 | 3/2002 | Felber et al. |
| 6,367,703 B1 | 4/2002 | Morosas |
| 6,450,244 B1 | 9/2002 | Bassilakis |
| 6,508,066 B1 | 1/2003 | Mierins et al. |
| 6,574,950 B2 | 6/2003 | Nash |
| 6,575,228 B1 | 6/2003 | Ragland et al. |
| 6,612,267 B1 | 9/2003 | West |
| 6,619,063 B1 * | 9/2003 | Brumett ............. F24F 3/153 62/264 |
| 6,644,049 B2 | 11/2003 | Alford |
| 6,675,601 B2 | 1/2004 | Ebara |
| 6,684,653 B2 | 2/2004 | Des Champs et al. |
| 6,820,681 B2 | 11/2004 | Ohgami et al. |
| 6,855,050 B2 | 2/2005 | Gagnon et al. |
| 6,889,750 B2 | 5/2005 | Lagace et al. |
| 6,966,356 B2 | 11/2005 | Yeung |
| 6,997,006 B2 | 2/2006 | Kameyama et al. |
| 7,028,752 B2 | 4/2006 | Palffy et al. |
| 7,059,385 B2 | 6/2006 | Mailala |
| 7,090,000 B2 * | 8/2006 | Taylor ............. F24F 12/006 165/103 |
| 7,150,314 B2 | 12/2006 | Moffitt |
| 7,188,666 B2 | 3/2007 | Lee et al. |
| 7,316,261 B2 | 1/2008 | Cho et al. |
| 7,337,752 B2 | 3/2008 | Boros et al. |
| 7,400,501 B2 | 7/2008 | Bartell et al. |
| 7,441,586 B2 | 10/2008 | Chung et al. |
| 7,445,038 B2 * | 11/2008 | Liu ............. F24F 3/1423 165/54 |
| 7,455,038 B2 | 11/2008 | Sic et al. |
| 7,484,381 B2 | 2/2009 | Lattanzio |
| 7,565,923 B2 | 7/2009 | Liu et al. |
| 7,575,178 B2 | 8/2009 | Loewen et al. |
| 7,601,206 B2 | 10/2009 | Call et al. |
| 7,802,443 B2 | 9/2010 | Wetzel |
| 7,841,381 B2 | 11/2010 | Chagnot et al. |
| 7,878,236 B1 | 2/2011 | Breen |
| 7,900,315 B2 | 3/2011 | Cunningham |
| 8,157,891 B2 | 4/2012 | Montie et al. |
| 8,162,042 B2 | 4/2012 | Haglid |
| 8,235,093 B2 * | 8/2012 | Grinbergs ......... H01M 8/04074 165/8 |
| 8,276,892 B2 | 10/2012 | Narikawa et al. |
| 8,381,804 B2 | 2/2013 | Slaughter |
| 8,479,440 B2 | 7/2013 | Demonte et al. |
| 8,590,602 B2 | 11/2013 | Fernandez |
| 8,621,884 B2 | 1/2014 | Stammer et al. |
| 8,702,483 B2 | 4/2014 | Weng et al. |
| 8,720,109 B2 | 5/2014 | O'Brien et al. |
| 9,835,353 B2 | 12/2017 | McKie et al. |
| 10,041,743 B2 * | 8/2018 | Heberer ............. F28D 21/0001 |
| 10,760,856 B2 * | 9/2020 | Heberer ............. F28D 21/0001 |
| 2001/0018964 A1 | 9/2001 | DeGregoria et al. |
| 2001/0052240 A1 | 12/2001 | Kim et al. |
| 2002/0036238 A1 | 3/2002 | Riley et al. |
| 2005/0103464 A1 | 5/2005 | Taylor |
| 2005/0115013 A1 | 6/2005 | Biere |

(56) References Cited

U.S. PATENT DOCUMENTS

| | | |
|---|---|---|
| 2005/0133204 A1 | 6/2005 | Gates et al. |
| 2005/0224591 A1 | 10/2005 | Wolfson |
| 2005/0236150 A1 | 10/2005 | Chagnot et al. |
| 2006/0021375 A1 | 2/2006 | Wetzel et al. |
| 2006/0114637 A1 | 6/2006 | Ashworth |
| 2006/0252363 A1 | 11/2006 | Charlebois et al. |
| 2007/0084586 A1 | 4/2007 | Poirier |
| 2007/0205297 A1 | 9/2007 | Finkam et al. |
| 2007/0261558 A1 | 11/2007 | Ashworth |
| 2008/0035472 A1 | 2/2008 | Lepage |
| 2008/0047544 A1 | 2/2008 | Han |
| 2008/0250800 A1 | 10/2008 | Wetzel |
| 2008/0271874 A1 | 11/2008 | Gietzen |
| 2009/0114369 A1* | 5/2009 | Kammerzell ........... F28F 3/044 165/47 |
| 2009/0133851 A1 | 5/2009 | Caldwell |
| 2010/0186927 A1 | 7/2010 | Gietzen |
| 2010/0198411 A1 | 8/2010 | Wolfson |
| 2010/0307175 A1 | 12/2010 | Teige et al. |
| 2011/0088417 A1 | 4/2011 | Kayser |
| 2011/0146941 A1 | 6/2011 | Benoit et al. |
| 2011/0155343 A1* | 6/2011 | Boudreau ............... F24F 12/00 165/10 |
| 2011/0303389 A1 | 12/2011 | Knuth |
| 2012/0168119 A1* | 7/2012 | Dunnavant ........ H05K 7/20745 165/59 |
| 2012/0193820 A1 | 8/2012 | Montie et al. |
| 2012/0216558 A1 | 8/2012 | Dempsey et al. |
| 2013/0017774 A1* | 1/2013 | Zorzit .................. F24F 1/0007 454/239 |
| 2013/0087302 A1 | 4/2013 | McKie et al. |
| 2013/0092344 A1 | 4/2013 | Perez et al. |
| 2013/0092345 A1 | 4/2013 | McKie et al. |
| 2013/0092346 A1 | 4/2013 | McKie et al. |
| 2013/0095744 A1 | 4/2013 | McKie et al. |
| 2013/0105104 A1* | 5/2013 | Wiley ..................... F24F 3/147 165/8 |
| 2013/0116951 A1 | 5/2013 | McKie et al. |
| 2013/0124111 A1 | 5/2013 | McKie et al. |
| 2013/0225060 A1 | 8/2013 | Heberer et al. |
| 2013/0248154 A1 | 9/2013 | Haglid |
| 2014/0138076 A1 | 5/2014 | Heberer et al. |
| 2014/0190656 A1* | 7/2014 | Heberer ................ F24F 12/006 165/4 |
| 2014/0190657 A1 | 7/2014 | Heberer et al. |
| 2014/0190670 A1 | 7/2014 | Dempsey et al. |
| 2014/0273800 A1 | 9/2014 | Carlyon |
| 2014/0374065 A1 | 12/2014 | Heberer et al. |
| 2015/0176913 A1* | 6/2015 | Buckrell ................ F28D 9/0012 165/166 |
| 2015/0216298 A1 | 8/2015 | Delorean et al. |
| 2015/0285524 A1* | 10/2015 | Saunders ................ F24F 7/065 454/239 |
| 2017/0211826 A1* | 7/2017 | Mariotto ............... F28D 9/0037 |
| 2019/0063780 A1* | 2/2019 | Puttagunta ............ F24F 12/006 |
| 2019/0154270 A1* | 5/2019 | Florian ..................... F24D 5/12 |
| 2019/0277576 A1* | 9/2019 | Toubiana ............... B22F 3/1055 |

FOREIGN PATENT DOCUMENTS

| | | |
|---|---|---|
| JP | 61130753 A | 6/1986 |
| JP | 62255980 A | 11/1987 |
| JP | 0692843 B2 | 11/1994 |
| JP | 200035239 A | 2/2000 |
| KR | 20100104465 | 9/2010 |

* cited by examiner

METHOD OF OPERATING AN ENERGY RECOVERY SYSTEM

CROSS-REFERENCE TO RELATED APPLICATIONS

This application is a divisional application of U.S. patent application Ser. No. 14/074,055 filed Nov. 7, 2013, which claims the benefit of an earlier filing date of U.S. Patent Application No. 61/749,658, filed Jan. 7, 2013 the contents of which are incorporated by reference herein in their entirety.

BACKGROUND OF THE INVENTION

Embodiments relate generally to heat and mass exchangers and, more particularly, to an energy recovery ventilator ("ERV") that attaches directly to an existing furnace, fan coil or air handler and uses two duct connections for recovering energy from indoor air.

An ERV is generally used with a heating and cooling system to exhaust stale air from a stale air space to a fresh air space and bring in fresh air from the fresh air space to the stale air space while exchanging heat or cool energy, thereby reducing heating or cooling requirements. Typically, an ERV includes a heat and mass exchanger contained in a housing for exchanging heat or cool energy. The exchanger may be rotating or stationary. When the ERV is used with a heating and cooling, an outside air stream ducted from the outdoors and a stale room air stream from the return air duct or furnace, fan coil, or air handler separately enter the ERV and pass through the heat and mass exchanger. Within the heat and mass exchanger, energy from the stale room air stream is transferred either to or from the outside air stream. The outside air stream then exits the ERV to the supply air duct or furnace, fan coil, or air handler as a fresh air stream. The stale room air stream then exits the ERV to the outdoors through a duct as an exhaust room air stream.

Most residential ERVs are mounted on a wall or ceiling and generally require four duct pipes to exchange cool or heat energy with an air handler system. In an example, the outside air stream and the stale room air stream enter the housing through duct pipes connected to two air flow openings in the housing. The fresh air stream and the exhaust room air stream exit the housing through two other duct pipes connected to two other air flow openings in the housing. These ERVs are standalone heat and mass exchangers that are remotely mounted from the heating and cooling system and are not designed to be connected directly to a furnace or an air handler in a heating and cooling system. As connected to the heating and cooling system, this ERV is costly and cumbersome to install as it requires the installation of four separate duct pipes to carry each air stream to or from the fresh air or stale air spaces. Moreover, these ERVs require low voltage wall controls and an available power receptacle, which further complicates the installation process.

Other ERV's are configured to connect directly to a furnace or air handler blower compartment, eliminating the need for the four duct pipes. These ERV's, however, are prone to allow increased levels of stale air recirculation in the heating and cooling system.

BRIEF DESCRIPTION OF THE INVENTION

According to one aspect of the invention, an energy recovery system includes a heating and cooling system and an energy recovery ventilator operably connected to a component of the heating and cooling system. The energy recovery ventilator includes a supply port extending into the component to provide a supply of fresh airflow from the energy recovery ventilator to the component of the heating and cooling system for use by the component. A return port extends into the component configured to receive a flow of stale air from the component while minimizing ingestion of the fresh air flow from the component into the return port.

According to another aspect of the invention, a method of operating an energy recovery system includes flowing a flow of fresh air from an energy recovery ventilator through a supply port into a component of a heating and cooling system for use by the component. Stale air is flowed from the component through a return port into the energy recovery ventilator. The flow of fresh air is prevented from recirculating through the return port.

These and other advantages and features will become more apparent from the following description taken in conjunction with the drawings.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

An embodiment of an energy recovery ventilator ("ERV") for use with a heating and cooling system includes a generally rectangular housing that may be directly attached to an existing furnace/fan coil in the system. The ERV includes a fresh air intake duct and an exhaust air duct. In an embodiment, an outside air stream enters the ERV through the fresh air intake duct while stale conditioned air from an interior conditioned air space is exhausted through the exhaust air duct. The ERV includes a heat and mass exchange device for recovering energy from the stale conditioned air prior to exhausting the stale conditioned air to an outside air space. In an embodiment, the ERV may be used with a wall penetration that provides a simplified duct assembly for connecting the ducts to the outside air space. In an embodiment, the ERV may be electrically wired directly, via a wire line, to a power supply in the heating and cooling system in order to energize the ERV and eliminate providing a standalone power supply. In one non-limiting embodiment, a two-wire line may be used to simplify the electrical connection to the heating and cooling system. But, in other embodiments, any number of wire-lines may be used to electrically connect the ERV to the heating and cooling system. The ERV may also be connected to a furnace/fan coil controller in the heating and cooling system for controlling the operation of the ERV without requiring an additional dedicated controller for ERV control and operation.

Figure 1:
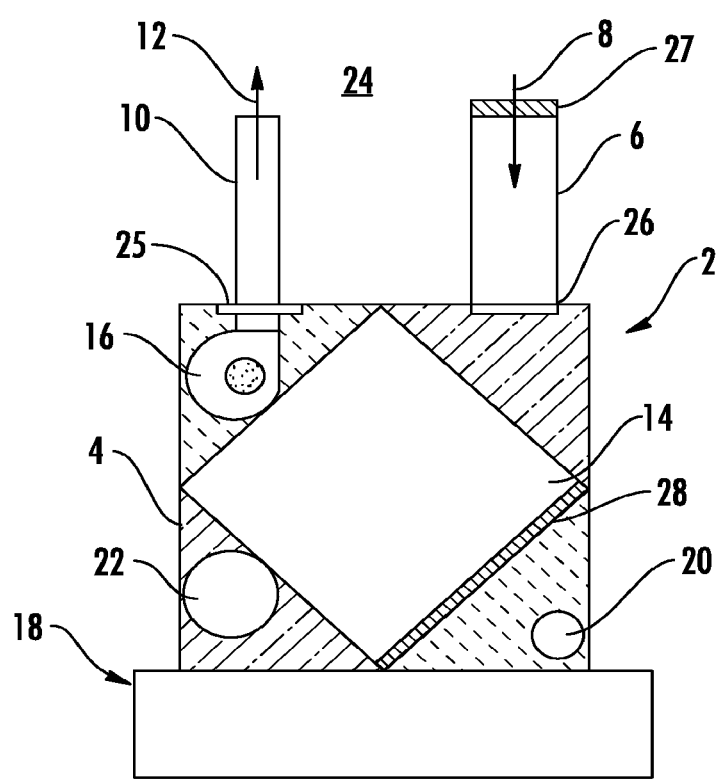
FIG. 1 is a view of an embodiment of an energy recovery ventilator (ERV)
Figure 2:
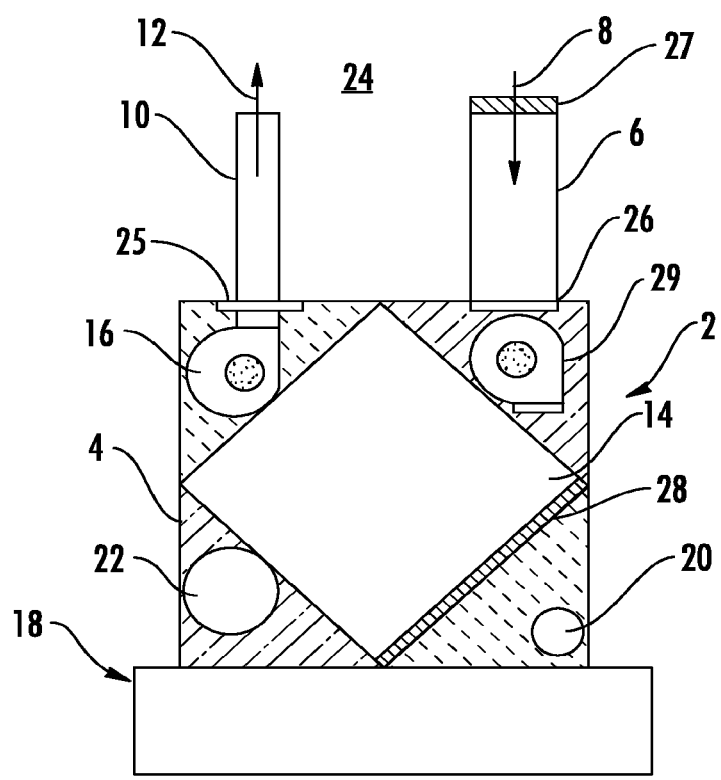
FIG. 2 is a view of another embodiment of an ERV.

Referring now to the drawings, FIGS. 1-2 illustrate an ERV 2 used in connection with a heating and cooling system 18 for circulating fresh air from the outdoors while recovering energy from stale conditioned air according to an embodiment of the invention. Particularly, the ERV 2 includes a generally rectangular housing 4 fitted with a fresh air intake duct 6 and an exhaust air duct 10. The fresh air intake duct 6 and exhaust air duct 10 are coupled to selectively movable dampers 25, 26, respectively. The dampers 25, 26 are selectively controllable by a furnace/fan coil controller (not shown) in response to signals such as, for example, signals indicative of temperature or humidity that are received from sensors inside the ERV 2 or inside the interior conditioned space. In some non-limiting examples, the dampers 25, 26 may be a valve or plate that stops or regulates the flow of air entering or exiting ERV 2 through the respective ducts 6, 10. The ERV 2 also includes a heat and mass exchange device 14 such as, in some non-limiting examples, a honeycomb heat exchanger or a brazed-plate heat exchanger for recovering energy from stale conditioned air. The stale conditioned air is received through a return port 20, which is in fluid communication with an air return duct coupled to the heating and cooling system 18. A fan 16 is coupled to the heat exchange device 14 in order to induce air movement through the heat exchange device 14 as well as induce to a positive air pressure in the furnace/fan coil of the heating and cooling system 18. In an embodiment, as shown with reference to FIG. 2, a fan or blower 29 may also be fluidly coupled to the fresh air intake duct to either induce air intake from an outdoor air space 24 or control the air flow rate entering the ERV 2 from the outdoor air space 24.

A filter element 27 is coupled to duct connection 6 in order to filter out any dust, debris, pollutants, or the like from the outside air stream 8. Additionally, in an embodiment, a filter element 28 is coupled to a return port 20 to filter an exhaust air stream 12 that is received from a return air duct that is in fluid communication with an interior conditioned air space. In another embodiment, a filter element, which is substantially similar to filter element 28, may be coupled to supply port 22 near or attached to the face of the heat exchanger 14 in order to filter the outside air stream 8. In operation, an outside air stream 8 from, for example, an outdoor air space 24 enters the ERV 2 through duct 6 while stale conditioned air from an interior conditioned air space is received by ERV 2 and exhausted as an exhaust air stream 12 through the exhaust air duct 10. Dampers 25, 26 control the air flow rate entering or exiting the ERV 2 or, alternatively, Dampers 25, 26 may be closed to bypass the ERV 2. The outside air stream 8 circulates through the heat exchange device 14 where energy exchange takes place within the heat exchange device 14. The extracted energy is transferred to the outside air stream 8 and it enters the heating and cooling system 18 as a fresh air stream through the supply port 22.

In an embodiment, as shown in FIGS. 1-2, the ERV 2 may be electrically wired directly, via a two-wire line, to the heating and cooling system 18 in order to energize ERV 2. The direct wiring eliminates need for providing an additional energizing power supply for energizing electrical components of the ERV 2. Also, the ERV may be selectively and electrically coupled to a controller (not shown) located in, for example, an electronics circuit board of the heating and cooling system 18. The controller (not shown) controls operation of the ERV 2 while also eliminating a need for an additional controller, thereby simplifying the installation as well as reducing the costs associated with installation. In an example, the controller may operate the ERV 2 while the furnace/fan coil air circulation blower is on in order to provide a desired ventilation rate through the heating and cooling system 18. In another example, the controller may operate the ERV 2 for a portion of each hour based on the desired ventilation rate and the air flow capacity of the ERV 2. In an embodiment, the controller includes a microprocessor preprogrammed with software programs that is stored in nonvolatile memory for executing algorithms to provide the ERV 2 with a variety of operation modes and control sequences as indicated above.

In another embodiment, shown in FIGS. 1-2, the ERV 2 may be directly attached to, for example, an air circulation blower compartment of a furnace/fan coil of the heating and cooling system 18 through bolts, screws, or the like. But, in another non-limiting embodiment, the ERV 2 may be attached to a return air duct of an air handler without departing from the scope of the invention. In an embodiment, the ERV 2 may be electrically connected to a power supply as well as to a controller of the furnace/fan coil, thereby eliminating a need for an additional power receptacle or a dedicated controller, respectively. In an embodiment, the heating and cooling system 18 may include fans (e.g., blowers, air handlers, and the like) to communicate air flow from an interior air space to the ERV 2. Other system components such as dampers, filters, additional fans, refrigeration and/or heating/dehumidification (e.g., economizer heat exchangers, heat rejection heat exchangers, and gas coolers/condensers), heat absorption heat exchangers (evaporator) may also be provided. In operation, outside air stream 8 enters the housing 2 through the duct connection 6 while stale conditioned air from the interior conditioned air space passes through the heat exchange device 14. The heat exchange device 14 extracts energy from the stale conditioned air and exhausts the stale conditioned air as an exhaust air stream 12 from the ERV 2. The outside air stream 8 circulates through the heat exchange device 14 where energy is transferred to the outside air steam 8 within the heat exchange device 14. The outside air stream 8 receives the extracted energy and enters the heating and cooling system 18 as a fresh air stream through the supply port 22. Further, stale conditioned air 12 is extracted from, in one non-limiting example, a return air duct that is directly connected to a conditioned air space. The stale conditioned air 12, driven by fan 16, enters the ERV 2 through return port 20, circulates through the heat exchange device 14, and exits the ERV 2 through duct connection 10.

Figure 3:
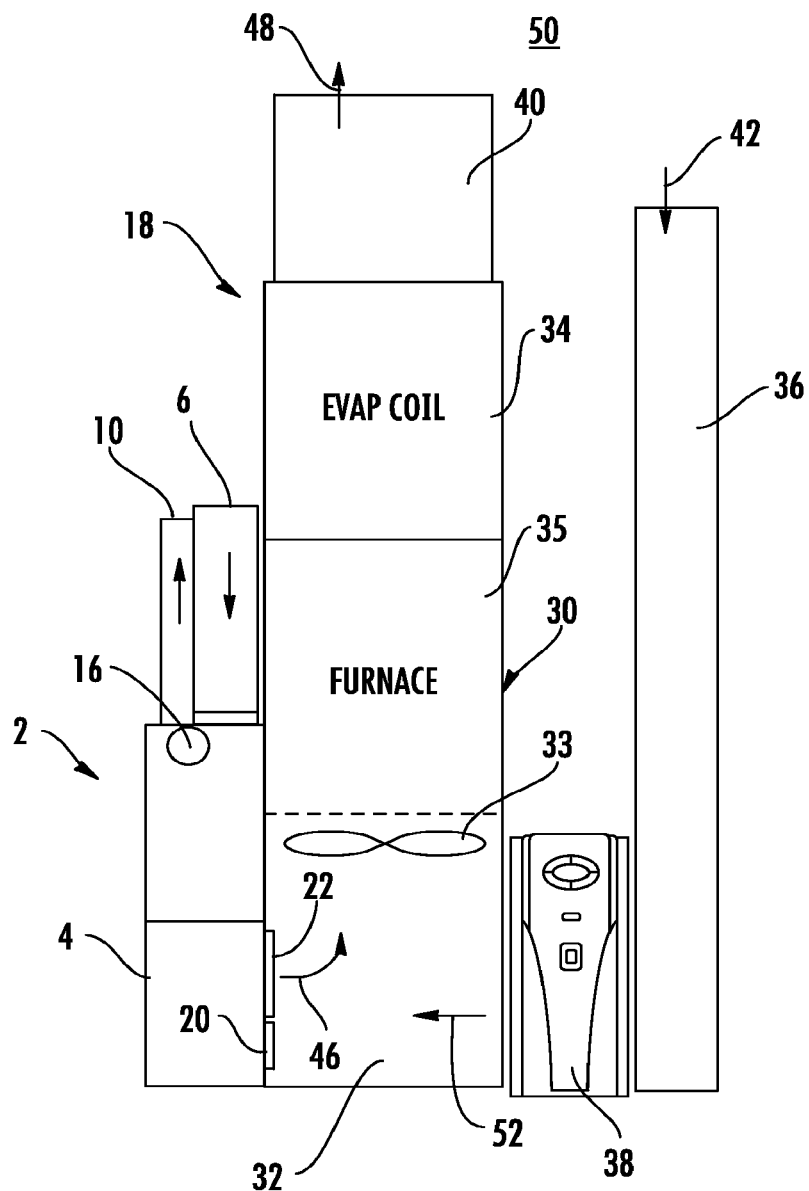
FIG. 3 illustrates an embodiment of an ERV connected to a heating and cooling system.

FIG. 3 illustrates an elevation view of an ERV 2 that is in direct air flow communication with a furnace/fan coil 30 of system 18 according to another embodiment of the invention. As shown, the ERV 2 is sized to be directly connected to a circulation air blower compartment 32 of furnace/fan coil 30 and receives an air flow from the compartment 32 for energy recovery and recirculation to the interior conditioned air space 50. The ERV 2 includes a fresh air intake duct 6 and an exhaust air duct 10. The ERV 2 also includes a return port 20 and a supply port 22 that are in direct communication with the circulation air blower compartment 32. The ERV 2 is shown installed in a vertical orientation directly coupled to furnace/fan coil 30, which is also vertically oriented. But, in another embodiment, ERV 2 may be installed in a horizontal orientation in order to be coupled to a corresponding horizontally oriented heating and cooling system 18 without departing from the scope of the invention. A stale conditioned air stream 42 from an interior conditioned air space 50 enters system 18 through the return air duct 36. In an embodiment, an air cleaner such as, for example, an air purifier 38 is provided to filter the stale conditioned air stream 42 and communicate a filtered air stream 52 to the negative pressure chamber of circulation air blower compartment 32. In another embodiment, an air filter element (not shown) may be provided in lieu of the air purifier 38 in order to filter the stale conditioned air stream 42. The filtered air stream 52 enters the ERV 2 through return port 20 whereby energy is extracted by the heat and mass exchange device 14 (shown in FIGS. 1-2) prior to exiting the ERV 2 to the outdoor air space via duct 10. This extracted energy is transferred to an outside air stream 8 (shown in FIGS. 1-2) that enters the ERV 2 through intake duct 6. The outside air stream 8 (shown in FIGS. 1-2) is further communicated to the compartment 32 as a fresh air stream 46 through supply port 22. The fresh air stream 46 mixes with the filtered air stream 52 in the compartment 32. The circulation air blower 33 creates a positive pressure in a furnace/fan coil compartment 35. The positive pressure overcomes the negative pressure in the circulation air blower compartment 32 and forces the mixed air from compartment 32 through the evaporator coil compartment 34 for heat-exchange within the evaporator coil compartment 34. The mixed air is forced out of evaporator coil compartment 34 and through the air supply duct 40 as conditioned filtered air 48 in order to condition the interior conditioned air space 50. It is to be appreciated that the ERV 2 mounts directly to the furnace/fan coil 30 in order to exhaust filtered air stream 52 from air blower compartment 32 while overcoming the negative static pressure in the blower air compartment 32.

Figure 4:
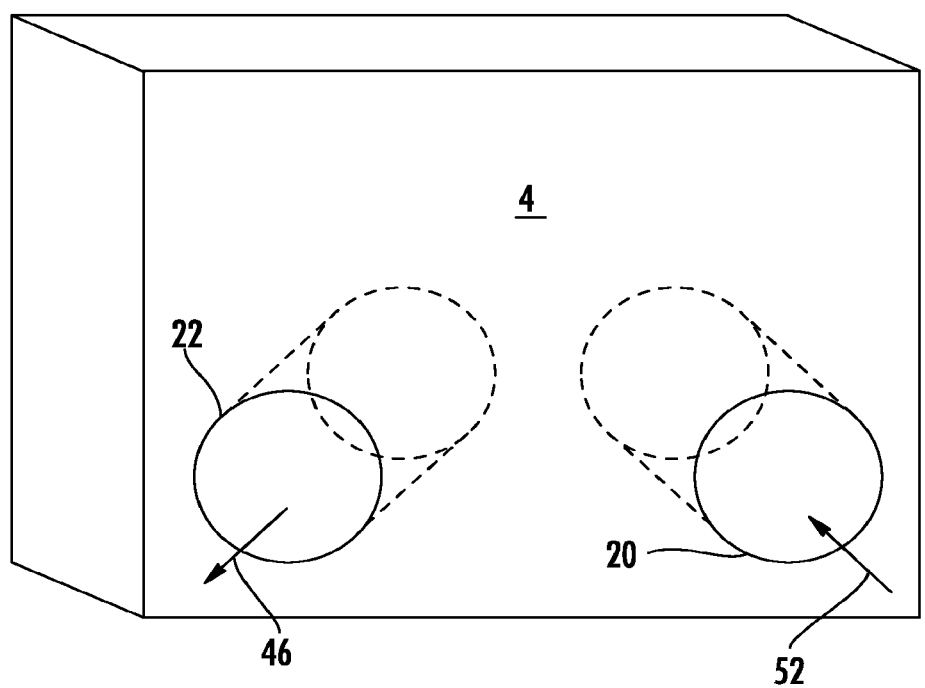
FIG. 4 illustrates embodiments of fresh air and return air ports between an embodiment of an ERV and a heating and cooling system.

Referring to FIG. 4, an embodiment of a supply port 22 and return port 20 is shown. The supply port 22 and the return port 20 extend through the ERV housing 4 and into the blower compartment 32, and are secured to one or both of the housing 4 or the blower compartment 32 by, for example, a snap fit. Alternatively, the supply port 22 and/or the return port 20 are secured to the housing 4 or the blower compartment 32 by fasteners such as screws, pins or the like. The ports 20 and 22 shown in FIG. 4 have are configured to direct flow in a selected direction and have, for example, an elbow-shaped cross-section. If the selected direction is changed, the flow may be redirected by rotating the ports 20 and 22 in openings through which they extend. The ports 20 and 22 are positioned to reduce recirculation of stale air through the heating and cooling system 18, either through their orientation as above, or through their position in the ERV housing 4, or both. As shown in FIG. 4, the supply port 22 and the return port 20 are oriented to ensure that the fresh air stream 46 flowing through the supply port 22 into the blower compartment is directed away from the return port 20 to minimize reingestion of fresh air stream 46 into the return port 20, and maximizing filtered stale airstream 52 flowed through the return port 20 from the blower compartment 32 and into the ERV 2.

Figure 5:
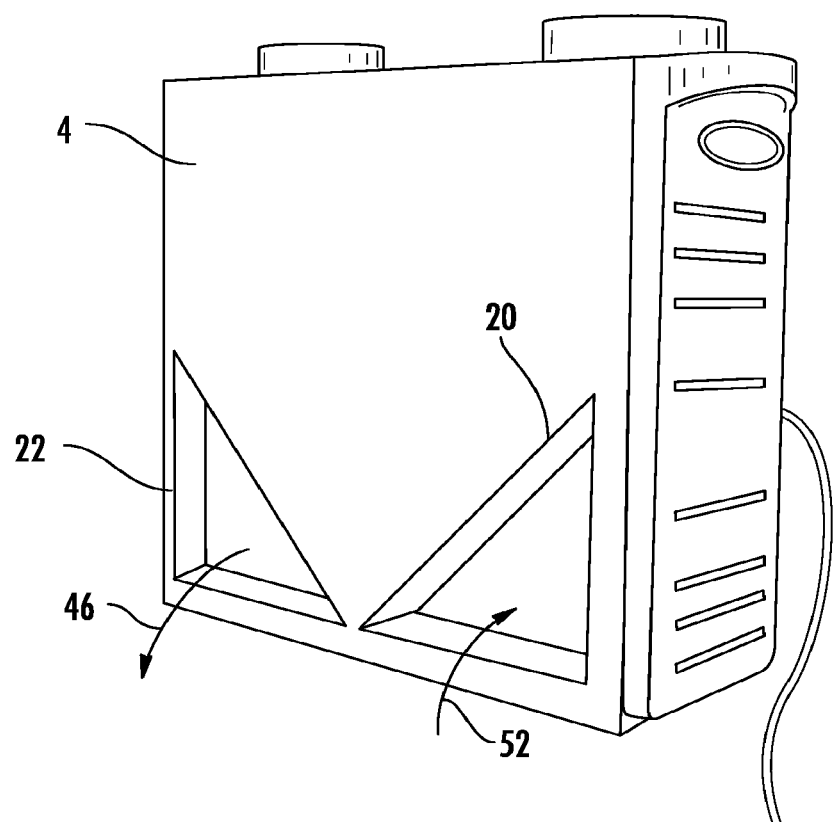
FIG. 5 illustrates other embodiments of fresh air and return air ports between an embodiment of an ERV and a heating and cooling system.
Figure 6:
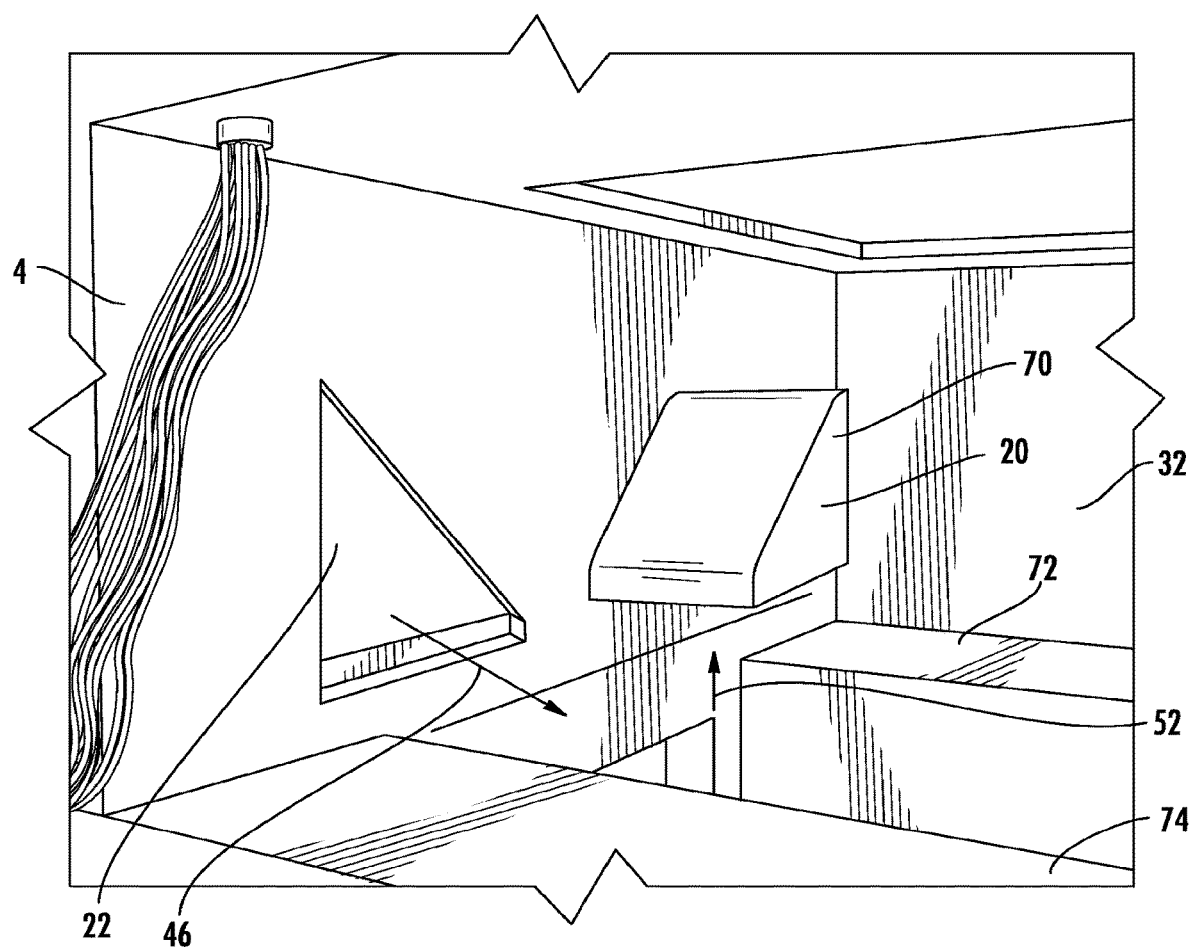
FIG. 6 illustrates still other embodiments of fresh air and return air ports between an embodiment of an ERV and a heating and cooling system.

In other embodiments, as shown in FIG. 5, the supply port 22 and the return port 20 are triangular in cross-section. The triangular cross-section increases the flow path size for the fresh air stream 46 and the filtered stale airstream 52 to and from the blower compartment 32. Increasing the flowpath size beneficially increases a rate of which the fresh air stream 46 can be delivered to the blower compartment 32 as well as increasing circulation of the filtered stale airstream 52 from the blower compartment 32 into the ERV 2 via the return port 20. As shown in FIG. 6, in some embodiments the return port 20 includes a shield 70 secured to the return port 20. The shield 70 is also triangular in shape and includes a shield opening 72 facing substantially downward into the blower compartment 32. The shield 70 having the downward-facing shield opening 72 reduces recirculation of the fresh air stream 46 into the return port 20 by drawing from a lower perimeter 74 of the blower compartment 32, reducing opportunities for the fresh air stream 46, which is urged substantially upward by the blower 33.

Figure 7:
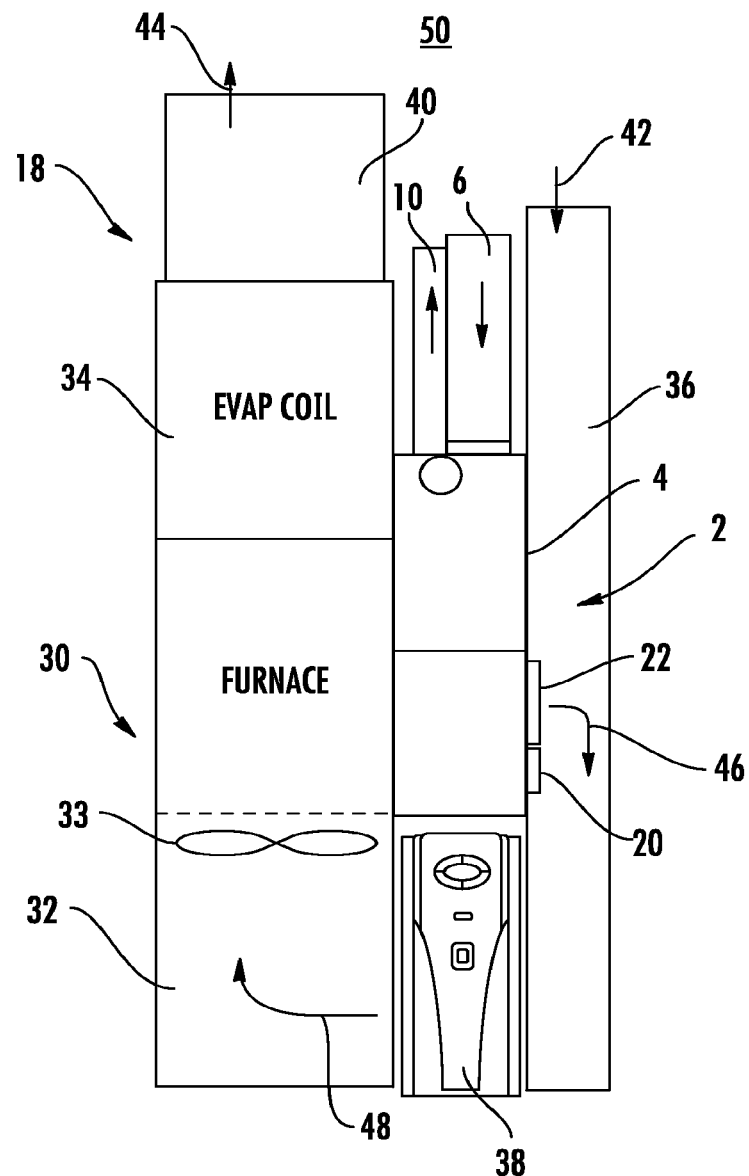
FIG. 7 illustrates yet other embodiments of fresh air and return air ports between an embodiment of and ERV and a heating and cooling system.
Figure 8:
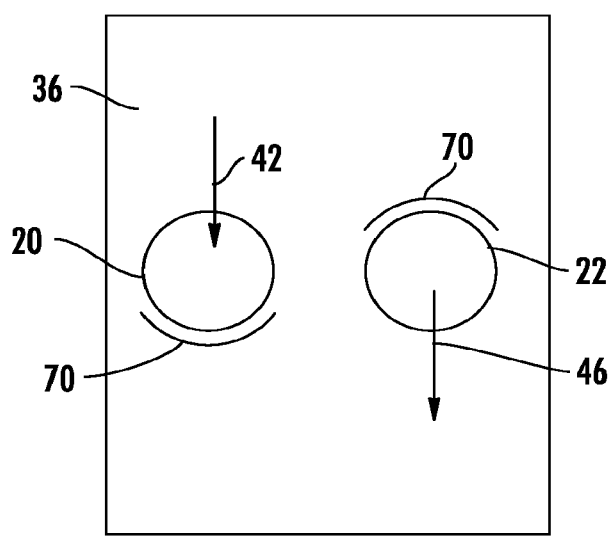
FIG. 8 illustrates an alternate view of the embodiments of FIG. 7.

Referring now to FIG. 7, in some embodiments, the ERV 2 is operably connected to a return air duct 36, as an alternative to being connected to the blower compartment 32. In the embodiment of FIG. 7, a stale air stream 42 is directed through the return air duct 36 toward the ERV 2. At least a portion of the stale airstream 42 is directed into the return port 20 of the ERV 2 and into the ERV 2, while the fresh airstream 46 is directed into the return air duct 36 through the supply port 22 toward the air purifier 38 and the blower compartment 32. The supply port 22 and return port 20 are configured and located to prevent reingestion of the fresh airstream 46 into the return port 20. As shown in the embodiment of FIG. 7, the return port 20 is located upstream of the supply port 22 in the return air duct 36. Further, in some embodiments, as shown in FIG. 8, the return port 20 may include a shield 70 with an upstream-facing shield opening 72 to further restrict recirculation of the fresh airstream 46 into the return port 20.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. A method of operating an energy recovery system comprising:
    flowing a flow of fresh air from an energy recovery ventilator through a supply port into a circulation air blower compartment of a heating and cooling system for use by the circulation air blower compartment;
    flowing stale air from the circulation air blower compartment through a return port into the energy recovery ventilator;
    providing a shield at the return port, the shield having a triangular cross-section in a plane parallel to a side wall of a housing of the energy recovery ventilator in which the report port is disposed; and preventing, via the shield, the flow of fresh air from recirculating through the return port.

2. The method of claim 1, further comprising flowing the stale airflow around the shield, the shield configured to prevent reingestion of the flow of fresh air into the return port.

3. The method of claim 1, wherein the return port draws the flow of stale air from a lower perimeter of the circulation air blower compartment.

\* \* \* \* \*